United States Patent [19]

Alf et al.

[11] 4,231,343
[45] Nov. 4, 1980

[54] DEVICE FOR CONTROLLING THE INTAKE AIR TEMPERATURE OF A CARBURETOR-EQUIPPED INTERNAL COMBUSTION ENGINE

[75] Inventors: Herbert Alf, Ludwigsburg; Volker Ernst, Sachsenheim; Rudi Hainle, Ludwigsburg; Rudolf Leipelt, Oberstenfeld, all of Fed. Rep. of Germany

[73] Assignee: Filterwerke Mann & Hummel GmbH, Ludwigsburg, Fed. Rep. of Germany

[21] Appl. No.: 30,897

[22] Filed: Apr. 17, 1979

[30] Foreign Application Priority Data

Apr. 18, 1978 [DE] Fed. Rep. of Germany ....... 2816727

[51] Int. Cl.³ ............................................ F02M 31/00
[52] U.S. Cl. ................................... 123/556; 123/552; 236/13
[58] Field of Search .......... 123/122 H, 122 D, 122 R; 236/13

[56] References Cited

U.S. PATENT DOCUMENTS

| | | | |
|---|---|---|---|
| 3,830,210 | 8/1974 | Muller | 123/122 D |
| 4,144,857 | 3/1979 | Bendig | 123/122 D |
| 4,161,930 | 7/1979 | Bendig | 123/122 D |

*Primary Examiner*—Ronald H. Lazarus
*Attorney, Agent, or Firm*—Joseph A. Geiger

[57] ABSTRACT

A device for adjusting the intake air temperature of a carburetor-equipped internal combustion engine whose air intake system has a flapper valve in a duct junction admitting cold raw air and/or preheated raw air to the intake filter, depending on the raw air temperature, the flapper valve position being controlled by a pneumatic membrane actuator which receives negative pressure from the intake manifold, via a vacuum line with a thermostat-controlled relief valve responsive to the temperature of the air mixture. In the drive connection between the membrane actuator and the flapper is arranged a wax thermostat which increases or decreases the effective length of the connection in response to the ambient air temperature, thereby adding the thermostat displacements to the actuator displacements, the effective length of the drive connection being further adjustable by means of a threaded connection which is arranged between the membrane support body of the actuator and the wax thermostat.

7 Claims, 3 Drawing Figures

DEVICE FOR CONTROLLING THE INTAKE AIR TEMPERATURE OF A CARBURETOR-EQUIPPED INTERNAL COMBUSTION ENGINE

BACKGROUND OF THE INVENTION

1. Field of the Invention

The present invention relates to air intake systems for carburetor-equipped internal combustion engines, and, more particularly, to an air intake system featuring a device for automatically controlling the intake air temperature by means of a continuously adjustable flapper valve which mixes cold raw air with preheated raw air, for the establishment of an optimal raw air intake temperature, under changing operating conditions.

2. Description of the Prior Art

The efficiency of carburetion and combustion in a carburetor-equipped internal combustion engine is highest, when the temperature of the combustion air which is consumed by the engine is maintained within an optimal temperature range. Whereas a higher than optimal air temperature reduces the volumetric efficiency of the engine, a lower than optimal air temperature leads to poor carburetion and, in extreme cases, to carburetor icing, especially under full-load operation.

The intake of cold raw air has the additional disadvantage of delaying the desired rapid warmup of the engine during a cold start. A rapid engine warmup is not only beneficial for the longevity of the engine, by minimizing engine operation in a state of poor lubrication, it is also important for ecological reasons, because the emission of exhaust polutants is higher than normal during engine warmup from a cold start.

It is generally considered impractical to cool a flow of raw intake air whose temperature is above the optimal range, but there exists a readily available, inexpensive source of heat for the purpose of preheating raw intake air whose temperature is below the optimal range. The cold raw air, or a variable portion thereof, is simply drawn through a so-called exhaust stove which is associated with the exhaust manifold of the engine. In the exhaust stove takes place a heat exchange between the hot exhaust gasses and the cold raw air.

A number of flow mixing devices for cold raw air and preheated raw air have already been proposed in the past. The present invention is an outgrowth of a prior invention which is disclosed in U.S. Pat. No. 4,144,857. The background information contained in the latter should be relied upon as background information for the present invention.

The aforementioned U.S. Pat. No. 4,144,857 features a wax thermostat as part of a drive connection between an air flow proportioning flapper valve and a pneumatic valve actuator. It has been found that the absence of a longitudinal adjustability of this drive connection represents a shortcoming in connection with a mass production setup, inasmuch as it necessitates narrow manufacturing tolerances on the constituent parts of the drive connection and on the supporting duct work. The necessary manufacturing accuracy and quality control reflect themselves in higher manufacturing costs and in a greater percentage of rejected parts.

SUMMARY OF THE INVENTION

Underlying the present invention is the objective of overcoming the aforementioned shortcoming of the control device suggested in U.S. Pat. No. 4,144,857 by adding an improvement thereto which eliminates the need for precision-manufactured parts, thereby lowering their production costs.

The present invention proposes to attain this objective by suggesting a drive connection for the air flow proportioning valve of the known intake air temperature controlling device in which the combined pneumatic actuator and wax thermostat unit includes calibrating means in the form of an axially displaceable threaded connection which permits an axial resetting of the engagement point of the wax thermostat on the membrane of the pneumatic actuator.

The advantages of such an adjustability are evident: While the invention permits the use of more generous tolerances on the constituent parts, it offers a way of adjusting the drive connection even more accurately than was the case with the prior art device. The result is more reliable maintenance of the temperature of the raw intake air.

In a preferred embodiment of the invention, the actuator membrane is attached to a rigid membrane support body which has an axially extending, internally threaded sleeve portion which continues in a frame extension for the wax thermostat. Engaging the threaded sleeve portion is an externally threaded cap with a central recess for the drive pin of the wax thermostat. Rotation of the threaded cap, by means of a screwdriver or some other suitable adjustment tool, thus produces an axial displacement of the connection point between the thermostat drive pin and the membrane support body of the pneumatic actuator.

The invention further suggests that the diameter of the threaded connection between the sleeve portion and the cap be such that the thermostat and its return spring can be inserted into their support frame in the axial direction, rather than sideways through the lateral apertures of the frame extension, as was the case previously. Adjustment access is provided through an opening in the center of the upper half of the actuator housing, the opening being tightly closed, after adjustment, by means of a snap lid. As in the known prior art device, the membrane actuator and the thermostat are advantageously manufactured and stored as a preassembled unit. At final assembly, when the unit is mounted on the air intake snorkel of the air intake system, the axial length of the drive connection is adjusted, in accordance with final assembly specifications, and the access opening in the actuator housing is closed.

In another preferred embodiment of the invention, the membrane support body of the actuator includes in its upper part a disc structure with an axially downwardly extending sleeve portion which is internally threaded and engages an externally threaded sleeve portion of the frame extension that carries the wax thermostat. This makes it possible to adjust the axial position of the wax thermostat relative to the membrane support body, thereby again providing the longitudinal adjustability of the drive connection between the actuator and the flapper of the air flow proportioning valve.

BRIEF DESCRIPTION OF THE DRAWING

Further special features and advantages of the invention will become apparent from the description following below, when taken together with the accompanying drawing which illustrates, by way of example, two embodiments of the invention which are represented in the various figures as follows.

DESCRIPTION OF THE PREFERRED EMBODIMENTS

In the following will be described two embodiments of the present invention, with particular reference to a known earlier invention which is the subject matter of U.S. Pat. No. 4,144,857, and to which the present invention adds a useful improvement. To the extent necessary for a complete disclosure of the present invention, the disclosure of U.S. Pat. No. 4,144,857 should be considered incorporated herein by reference.

Figure 1:
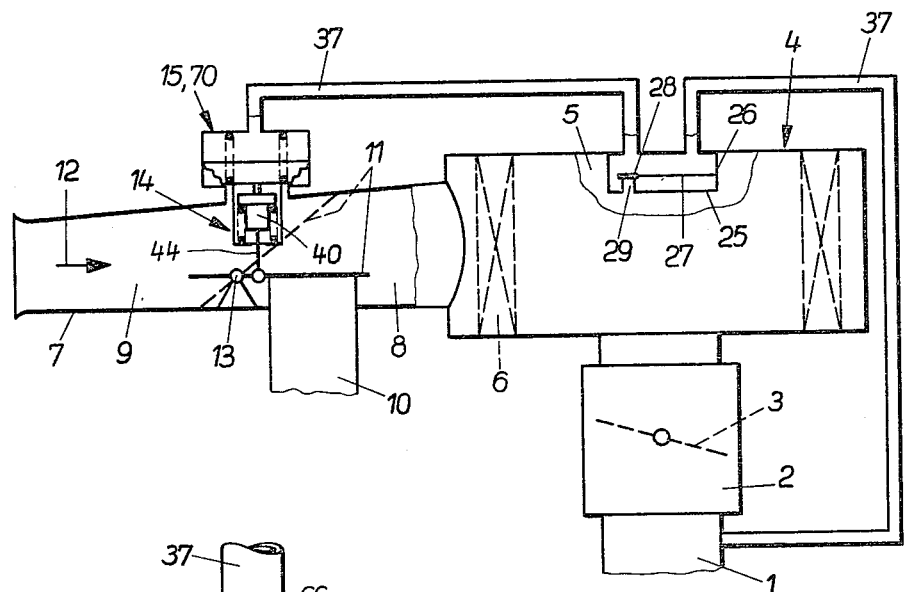
FIG. 1 shows, in a schematic representation, an arrangement of an air intake system for a carburetor-equipped internal combustion engine incorporating the temperature control device of the present invention.

In FIG. 1 of the drawing is shown, in a schematic elevational representation, an air intake system for a carburetor-equipped internal combustion engine, the engine itself being not shown. Such a system includes a carburetor 2 which is mounted on top of the air intake manifold 1 of the engine block, and an adjustable main throttle 3 inside the carburetor 2 controlling the amount of air which is being sucked into the cylinders of the engine, while fuel is being admixed to the air which flows through the carburetor 2. On top of the carburetor 2 is mounted an air intake filter 4 of conventional construction, the filter housing surrounding an annular filter element 6, at the inside of which is defined a clean air space 5.

Raw combustion air reaches the air intake filter 4 through an air intake snorkel 7 which admits raw air of ambient temperature into a cold air intake duct 9, past an intake duct junction with a warm air intake duct 10, and through a short raw air mixing duct 8 which opens into the air intake filter 4. The warm air intake duct 10 supplies preheated raw air to the duct junction from an exhaust stove. The cold air intake duct 9 and the raw air mixing duct 8 are preferably part of a straight, generally horizontal duct structure into which the exit opening of the vertical warm air intake duct 10 protrudes a short distance from below, so that it forms an exposed, generally horizontal duct mouth as part of the intake duct junction.

The duct mouth of the vertical warm air intake duct 9 forms part of an air flow proportioning valve of the flapper valve type which further includes a flat flapper 11 pivotably supported on a horizontal pivot axis 13 just upstream of the warm air duct mouth. The flapper 11 is designed to pivot between a horizontal end position in which it closes the warm air duct 10, and an inclined upper end position in which the warm air duct 10 is fully open, while the cold air intake duct 9 is completely, or almost completely, closed. Controlling the angular position of the flapper 11 is a pneumatic membrane actuator 15 (FIG. 2) or 70 (FIG. 3), forming part of a drive unit which is mounted on top of the cold air intake duct 9, a portion of the unit reaching downwardly into that duct, through an aperture in its wall.

The pneumatic membrane actuator 15, 70 receives negative air pressure from a point downstream of the carburetor main throttle 3, through a vacuum line 37 which leads past a thermostat-controlled relief valve 25. The latter is mounted inside the air intake filter 4, against its housing wall, in such a way that its bimetallic member 27 is exposed to the raw air in the clean air space 5, while its two connections for the vacuum line 37 are on the outside of the filter housing. Further details of such a thermostatic relief valve are disclosed in U.S. Pat. No. 3,830,210. The bimetallic member 27 of valve 25 carries on its free end a valve element 28 with which it progressively opens a relief port 29 to the clean air space 5, in response to increasing raw air temperatures. A small vent hole (not shown) in the valve housing 26, not large enough to reduce the negative pressure in the vacuum line 37, admits a limited air flow from the clean air space 5 into the valve housing 26, so that the air temperature inside the latter corresponds to the temperature of the combustion air in the clean air space 5.

Connecting the pneumatic membrane actuator 15, 70 to the pivotable flapper 11 is a drive assembly 14 which features a longitudinally extendable wax thermostat 40, as part of the flapper drive unit. The housing 42 of the wax thermostat 40 has a drive extension 44 which is pivotably connected to the flapper 11, downstream of its pivot axis 13.

Figure 2:
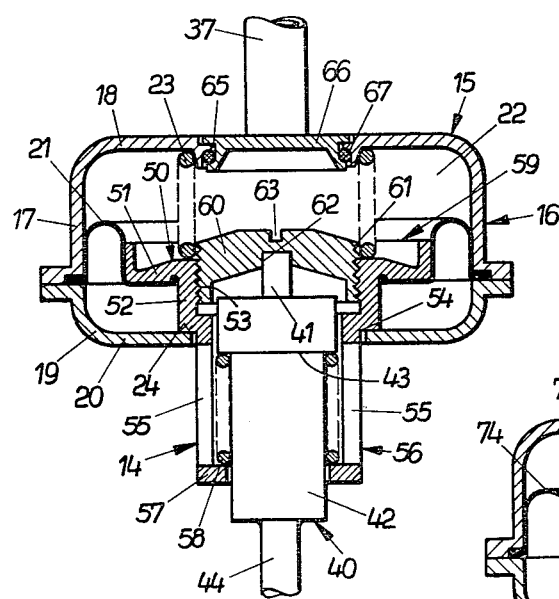
FIG. 2 shows, at an enlarged scale, a longitudinally cross-sectioned subassembly of a pneumatic membrane actuator and a wax thermostat, representing a first embodiment of the invention.
Figure 3:
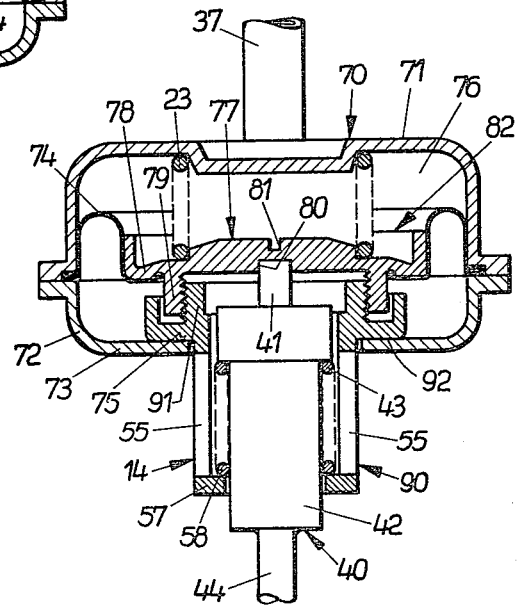
FIG. 3 shows a subassembly similar to that of FIG. 2, likewise longitudinally cross-sectioned, and representing a second embodiment of the invention.

Two different versions of a flapper drive unit are shown, at an enlarged scale, in FIG. 2 and FIG. 3, respectively. The flapper drive unit of FIG. 2 features a pneumatic membrane actuator 15 with an actuator housing 16 enclosing a rubber membrane 21 and a rigid membrane support body 59. The latter consists of a central supporting disc 50 and an axially oriented frame extension 56. A flange portion 51 of the supporting disc 50 is engaged from below by a matchingly shaped portion of the membrane 21, while an actuator return spring 23 engages the supporting disc 50 from the upper side.

Extending axially downwardly from the supporting disc 50 is a sleeve portion 52 with a female thread 53. An abutment shoulder 54 on the lower axial end of the sleeve portion 52 determines the rest position of the membrane actuator in cooperation with a stop face 24 formed by the bottom wall 20 of the actuator housing 16. To the lower axial end of the sleeve portion 52 is connected a frame extension 56 which, by reaching through an opening in the housing bottom wall 20, extends into the stream of cold raw air which flows through the cold air intake duct 9 in the direction of arrow 12 (FIG. 1). Lateral apertures 55 in the frame extension 56 expose the wax thermostat 40 to this air flow. The bottom 57 of the frame extension 56 serves as a support for a thermostat return spring 58 whose upper end bears against a shoulder 43 of the thermostat housing 42.

The central recess of the membrane supporting disc 50, formed by the female threads 53 of the sleeve portion 52, is occupied by a cap 60 with matching male threads 61. On its lower side, the cap 60 has a central recess 62 which axially positions the upper extremity of the drive pin 41 of the wax thermostat 40. A transverse slot 63 on the upper side of the cap 60 is designed for engagement by a screwdriver, so that the cap 60 can be rotated, in order to reposition the drive pin 41 of the wax thermostat 40 in the axial sense, thereby adjusting the overall length of the drive connection accordingly. It should be understood that, in the place of the screwdriver slot 63, the threaded cap 60 could have other configurations, such as interior or exterior polygonal faces, for example, for the rotational engagement by a matching adjustment tool.

Access to the cap 60 for the performance of the aforementioned rotational adjustment is provided through a central access opening 65 in the wall 18 of the top half 17 of the actuator housing 16. Because the membrane 21 and the housing top half 17 form a control pressure space 22, the access opening 65 in the top half 17 must be closed hermetically after adjustment of the drive connection. This purpose is served by a simple snap lid 66 with a gasket 67 which engages a small shoulder in the access opening 65.

The procedure for the assembly of the flapper drive unit of FIG. 2 is as follows: The rubber membrane 21 is attached to the flange portion 51 of the supporting disc 50, so as to become a part of the membrane support body 59. This support body, more accurately its frame extension 56, is then inserted from above through the centrally apertured bottom half 19 of the actuator housing 16. Into the frame extension 56 is inserted from above—either before or after emplacement of the membrane support body 59 in the housing bottom half 19—the wax thermostat 40 and its thermostat return spring 58. The orientation of the wax thermostat is such that its drive extension 44 reaches axially downwardly, while its drive pin 41 extends axially upwardly. Now, the cap 60 is threaded into the sleeve portion 52 of the membrane support body 59, so as to receive the thermostat drive pin 42 in its central recess 62. Lastly, the actuator return spring 23 is placed on top of the supporting disc 50 so as to be centered by the protruding cap 60, and the top half 17 of the actuator housing 16 is hermetically joined with the bottom half 19.

At the time of final assembly with the air intake system (FIG. 1), the axial length of the drive connection 14, as determined by the axial position of the threaded cap 60 in the membrane support body 59, is adjusted by means of a tool, e.g. a screwdriver, which is inserted through the access opening 65 in the wall 18 of the housing top half 17. Engaging the slot 63 of cap 60, the cap is rotated until the prescribed angular position of the flapper 11 (FIG. 1) is obtained. For this adjustment to be consistant, it is either necessary for all adjustments to be made at the same temperature, or an adjustment table must be available indicating the adjustment values for any temperature at which this adjustment may take place. Following this final adjustment, the threaded cap 60 is secured against the supporting disc 50, using preferably an adhesive which may then also serve as an air seal between the control pressure space 22 and the frame extension 56 of the membrane support body 59. Lastly, the snap lid 66 is inserted into the access opening 65.

The modified flapper drive unit of FIG. 3 contains a number of component parts which are identical with those of the drive unit of FIG. 2, as indicated by identical reference numerals. The pneumatic membrane actuator 70 consists again of an actuator housing which is composed of a top half 71 and a bottom half 72 with a centrally apertured bottom wall 73. The rubber membrane 74 on the membrane support body 82 and the actuator return spring 23 in the control pressure space 76 are unchanged from the earlier embodiment.

The membrane support body 82 comprises again a supporting disc 77 and an axially downwardly oriented frame extension 90. The supporting disc 77 has again a flange portion 78 to which the membrane 74 is attached. Against the upper side of the supporting disc 77 rests the lower extremity of the actuator return spring 23. However, unlike in the drive unit of FIG. 2, where the membrane support body 59 is of one piece, the membrane support body 82 of the drive unit of FIG. 3 is composed of two pieces which are threaded together and therefore axially adjustable relative to each other. For this purpose, the supporting disc 77 has a downwardly oriented, internally threaded sleeve portion 79 which engages an upwardly oriented, externally threaded sleeve portion 91 of the frame extension 90. A centering recess 80 for the thermostat drive pin 41 is arranged on the lower side of the supporting disc 77 and a screwdriver slot 81 is arranged on its upper side. Of course, the screwdriver slot 81 could again be replaced by some other suitable tool engagement configuration.

The frame extension 90 itself remains basically unchanged, reaching again downwardly into the cold air intake duct 9 (FIG. 1) so as to expose the wax thermostat 40 to the flow of ambient raw air through its apertures 55. The fully extended position of the frame extension 90 is again determined by a stop face 75 on the bottom wall 73 of the actuator housing, against which the frame extension 90 rests with an abutment shoulder 92.

The assembly of this drive unit calls for the insertion of the frame extension 90, together with the wax thermostat 40 and its return spring 58, into the bottom half 72 of the actuator housing. Now, the supporting disc 77, with the rubber membrane 74 attached thereto, is screwed onto the threaded sleeve portion 91 of the frame extension 90, thereby adjusting the prescribed axial length of the drive assembly 14. Following final adjustment, the threaded connection is preferably again secured against rotation. Lastly, the actuator return spring 23 is positioned against a centering shoulder of the supporting disc 77 and the top half 71 of the actuator housing is hermetically joined to its bottom half 72, thereby sealingly clamping the periphery of the rubber membrane 74.

During operation of the internal combustion engine, the entire air intake system is subjected to a negative pressure which is at a maximum inside the air intake manifold 1, below the carburetor main throttle 3, and which decreases in the direction of the cold air intake duct 9. The vacuum line 37 transmits the negative air pressure of the air intake manifold 1 to the control pressure space 22, above the membrane 21 of the pneumatic membrane actuator 15, or to the control pressure space 76, above the membrane 74 of the pneumatic membrane actuator 70, respectively. The force created by the difference in negative pressures above and below the membrane causes the latter to move in opposition to the actuator return spring 23, so as to displace the flapper 11 to which the membrane is connected via the membrane support body 59 or 82, respectively.

The negative pressure in the control pressure space 22 or 76 of the pneumatic membrane actuator is also influenced to an important degree by the action of the thermostat relief valve 25, to the extent that the latter may permit the entry of air into the valve housing 26, and hence into the vacuum line 37, by opening its relief port 29, when the bimetallic member 27 assumes an upward curvature in response to an increase in the temperature of the air which enters the clean air space 5 of the air intake filter 4.

As long as the internal combustion engine is operated with a substantially closed carburetor main throttle 3, as is the case when the engine is idling, for example, the negative pressure in the air intake manifold 1 is particularly high. If this condition is combined with a low ambient temperature, so that very cold raw air enters the air intake system, and, consequently, the relief port 29 of the thermostat relief valve 25 is completely closed, the actuator 15 will respond to this condition by moving its membrane all the way up, against the return spring 23, so that the flapper 11 is pivoted into its upper end position, shown by dotted lines in FIG. 1. In this position, the cold air intake duct 9 is substantially blocked off, while the warm air intake duct 10 is completely open to the raw air mixing duct 8 and to the filter 4, so that preheated raw air is being drawn into the system.

The continued operation of the internal combustion engine results in a rise in temperature of its exhaust system and, consequently, of the preheated raw air which is supplied through the warm air intake duct 10. When the temperature of the preheated air begins to exceed a certain level, it produces a response of the thermostat relief valve 25 which responds by slightly lifting its valve element 28 from the relief port 29, thereby allowing a small flow of air from the clean air space 5 into the vacuum line 37, so as to lower the negative pressure in the latter and in the control pressure space 22 or 76 of the pneumatic membrane actuator. As a result of the diminished pressure differential inside the actuator, the actuator return spring 23 now moves the membrane downwardly, thereby pivoting the flapper 11 a certain distance away from its upper end position, so that it admits both cold raw air from the cold air intake duct 9 and preheated raw air from the warm air intake duct 10. The resulting raw air mixture has a temperature at which the thermostat relief valve 25 maintains its relief position and at which the spring forces and air pressure forces acting on the membrane of the pneumatic membrane actuator, and the forces acting on the flapper 11 itself, are in an equilibrium state.

When the main throttle 3 of the carburetor 2 is opened, as a result of a depression of the accelerator pedal by the operator, the negative pressure inside the air intake manifold 1 is lowered until, with a fully open main throttle 3, the internal combustion engine operates under a full-load condition, in which case the negative pressure transmitted from the air intake manifold 1 to the control pressure space of the pneumatic membrane actuator is no longer sufficient to overcome the force of the actuator return spring 23. As a result of this condition, the membrane support body 50 or 82, respectively, assumes its rest position, in abutment against the stop face 24 or 75, respectively of the actuator housing. It follows that the position of the flapper 11 is at or near the horizontal position shown in FIG. 1, in which it blocks off the warm air intake duct 10, admitting only cold raw air from the cold air intake duct 9. By thus drawing in only cold raw air, the volumetric efficiency of the internal combustion engine is improved, and this higher volumetric efficiency is reflected in a higher power output.

However, the above-described situation for full-load operation applies only to conditions in which the ambient temperature, i.e. the temperature of the raw air entering the air intake snorkel 7, is at or above a certain temperature limit. An air temperature below that limit will cause the wax thermostat 40 to respond through a longitudinal contraction, so that the thermostat return spring 58 will lift the thermostat housing 42 and its drive extension 44, thereby shortening the effective length of the drive assembly 14 to such an extent that the flapper 11 cannot reach its horizontal position in which it would completely close off the warm air intake duct 10. This means that a quantity of preheated raw air will be admixed to the cold raw air, so that the air reaching the internal combustion engine can never be so cold as to cause the dreaded condition of carburetor icing.

The dimensions of the flapper drive unit and the characteristics of the wax thermostat 40 are preferably coordinated in such a way that, at varying ambient temperatures, a corresponding temperature compensation is achieved through extension or contraction of the wax thermostat in the drive connection between the pneumatic membrane actuator and the flapper, in cooperation with the thermostat return spring, so that a greater or lesser quantity of preheated raw air is admixed to the cold raw air, in order to obtain a substantially unchanged temperature of the raw air which enters the air filter and carburetor, under full load as well as under partial load when the thermostat relief valve provides an important controlling input. This novel temperature control system also makes it possible to compensate for different degrees of cooling of the raw air mixture between the flapper and the temperature-responsive thermostat valve at different ambient temperatures. This aspect is significant in cases where the actual air intake system has a relatively long raw air mixing duct.

It should be understood, of course, that the foregoing disclosure describes only preferred embodiments of the invention and that it is intended to cover all changes and modifications of these examples of the invention which fall within the scope of the appended claims.

We claim the following:

1. A device for controlling the intake air temperature of an internal combustion engine equipped with a carburetor in its air intake system and an air filter upstream of the carburetor; the device including a raw air mixing duct leading into the air filter from an intake duct junction formed by a cold air intake duct through which is taken in raw air of ambient temperature and a warm air intake duct through which is taken in preheated raw air coming from an exhaust stove, for example; the device further including: valve means associated with said intake duct junction for adjusting the relative flows of raw air through said cold air intake duct and warm air intake duct by progressively opening one duct while at the same time closing the other duct, a pneumatic valve actuator with an actuator return spring, a drive connection between the valve means and the moving member of said valve actuator, a vacuum line leading from a point downstream of the carburetor to said valve actuator and so connected to it that the negative pressure in the vacuum line displaces said moving actuator member against the actuator return spring, in the sense of opening the warm air intake duct closing the cold air intake duct, and, in said vacuum line, a thermostat-controlled relief valve arranged at a location where its thermostatically sensitive element is exposed to the temperature of the air flow downstream of the intake duct junction and responds to a temperature increase by progressively opening a relief port in the vacuum line to lower the negative pressure therein and to reset the valve means in the direction of closing the warm air intake duct; and the device still further including abutment means in the drive connection between said valve actuator member and the valve means, for limiting the return movement of the actuator member and drive connection, and a longitudinally expanding and contracting wax thermostat exposed to the raw air of ambient temperature and forming a portion of said drive connection, whereby an ambient temperature level below a predetermined value causes the wax thermostat to contract to such an extent that the fully returned actuator member and drive connection, as positioned by said abutment means, maintains the valve means in a position in which the warm air intake duct remains partially opened; the improvement in said device comprising:

an adjustable threaded connection between the moving member of the pneumatic valve actuator and the wax thermostat, which connection makes it possible to permanently increase or decrease the effective length of the drive connection.

2. A control device improvement as defined in claim 1, wherein the valve means includes a pivotable flapper whose pivot axis is arranged upstream of the duct junction and transversely to the general orientation of the drive connection;

the drive connection is a push-pull link between the moving member of the pneumatic valve actuator and the flapper;

the pneumatic valve actuator is of the type which has a housing and an axially guided moving member which, together, define a control pressure space, said space being in communication with the vacuum line;

the pneumatic valve actuator further includes, as constituent parts of its moving member, a flexible membrane and a membrane support body with a frame extension that reaches axially outwardly from the housing in the direction in which the drive connection is oriented;

the abutment means is defined between the valve actuator housing and the membrane support body;

the wax thermostat includes a thermostat housing and a thermostat return spring engaging the thermostat housing and the frame extension of the membrane support body, respectively, so as to bias the thermostat housing axially inwardly, towards the valve actuator housing; and the wax thermostat further includes a drive pin which protrudes axially inwardly from the thermostat housing and bears against a center portion of the membrane support body, under the bias of the thermostat return spring.

3. A control device improvement as defined in claim 2, wherein the center portion of the membrane support body which is engaged by the drive pin of the wax thermostat is in the form of an externally threaded supporting disc; and the membrane support body further includes an internally threaded sleeve portion inside which is rotatably received said supporting disc, the sleeve portion and supporting disc thereby serving as the adjustable threaded connection.

4. A control device improvement as defined in claim 3, wherein the membrane support body further includes an annular flange portion to which is attached the flexible membrane and which surrounds one extremity of its sleeve portion, the frame extension of the membrane support body beind attached to the other extremity of the sleeve portion.

5. A control device improvement as defined in claim 3 wherein the rotatable supporting disc includes force transmitting surfaces which are engageable by an adjustment tool, for the rotational repositioning of the supporting disc; and the valve actuator housing includes an access opening for said tool and a lid which normally closes said opening.

6. A control device improvement as defined in claim 2, wherein the center portion of the membrane support body which is engaged by the drive pin of the wax thermostat is in the form of a supporting disc, said disc having a peripheral flange portion to which is attached the flexible membrane, and an axially oriented threaded sleeve portion; and the frame extension of the membrane support body includes a matchingly threaded sleeve portion, in threaded engagement with the sleeve portion of the supporting disc, the two sleeve portions thereby serving as the adjustable threaded connection.

7. A control device improvement as defined in one of claims 3 through 6, wherein the return spring of the valve actuator is a helical compression spring;

the supporting disc of the membrane support body supports one extremity of the actuator return spring; and the supporting disc further includes means for positioning and centering said spring extremity.

* * * * *